June 16, 1964  A. L. HUBBARD  3,137,113
MOISTENER MECHANISM FOR COTTON HARVESTER
Filed Dec. 18, 1961
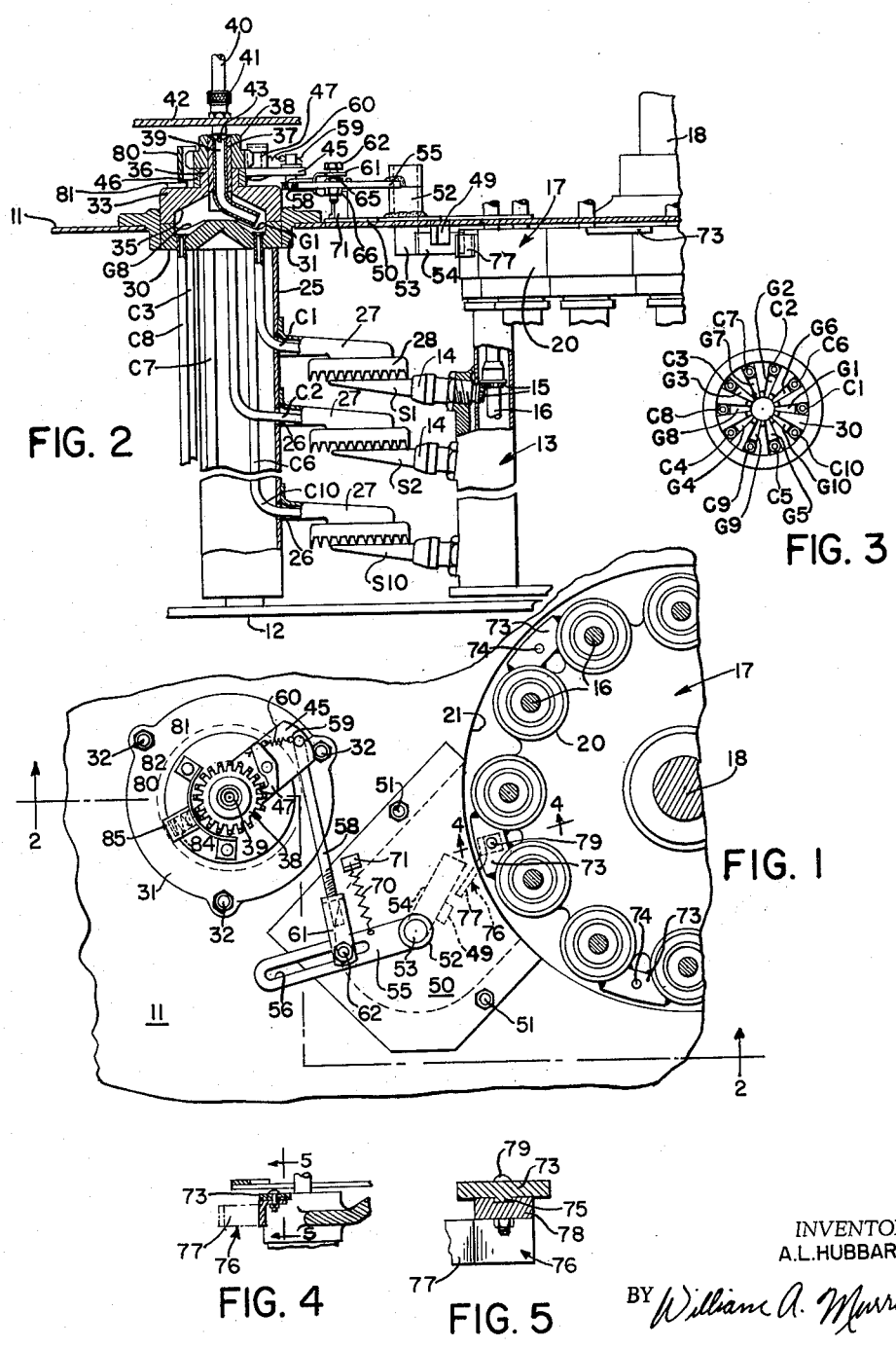
INVENTOR.
A.L. HUBBARD
BY William A. Murray
ATTORNEY

United States Patent Office 3,137,113
Patented June 16, 1964

3,137,113
MOISTENER MECHANISM FOR COTTON HARVESTER
Arthur L. Hubbard, Des Moines, Iowa, assignor to Deere & Company, Moline, Ill., a corporation of Delaware
Filed Dec. 18, 1961, Ser. No. 159,921
7 Claims. (Cl. 56—41)

This invention relates to a moistener mechanism used on a cotton harvester and more particularly to a means for effecting the pattern of fluid distribution in the moistener mechanism.

The moistening mechanism conventionally used on a cotton harvester is composed of an upright columnar member having a series of fluid conduits which feed through arms extending laterally from the columnar member into moistener pads at the ends of the arms. The arms and their respective moistener pads are normally positioned above the picking spindles of a picking drum so that as the drum rotates about its vertical axis the spindles will contact the underside of the moistener pads. The need for the moistener pads is to clean the plant juices from the spindles as well as to provide a thin coat or film of fluid on the spindles so that they may better harvest the cotton from the plants.

It has been the custom in the past to dispense fluid at an even rate to all the moistener pads, although it was recognized that some spindles required more fluid than others. Since normally the fluid supplied to the moistener pads is water, the waste of fluid in some pads is not of great moment since it merely drips or gravitates to the ground and even if it passes onto the cotton, there is not a great deal of harm or damage done. However, more recently there has come into being a special type fluid, usually of an oil base, which is of some expense and if passed onto the cotton in great quantities will reduce the over-all quality thereof. Consequently it has become apparent that it is necessary to regulate and to generally reduce the quantity of fluid passing into the pads which do not require the fluid and to increase the quantity of fluids into those pads which are in need of the fluid.

With the above in mind, it is the primary object of the present invention to provide an accurate metering system for passing the moistening fluid into the moistener pads.

Specifically it is the object of the present invention to provide a fluid dispenser which has its outlet end moving in an annular path and in line with an annular row of fluid inlets of the conduit means feeding into the moistener pads. Pawl and ratchet means are associated with the rotary type dispenser and operate to move the dispenser in an intermittent angular motion. The pawl and ratchet are driven by a linkage system which is adjustable to affect the amount of throw of each movement or of each reciprocation of the pawl. Lug means are provided on the picking drum so as to contact a portion of the linkage to cause the pawl to reciprocate.

It is also an object of the invention to provide conduits leading into the moistener pads in a predetermined pattern so as the fluid dispenser rotates it will pass fluid into the moistener pads in this pattern. By adjusting the linkage which controls the pawl, this pattern may be changed so as to completely eliminate some pads from receiving of fluid. This latter feature becomes important in fields in which the plants are relatively close to the ground and the lower spindles are the only spindles which normally contact the cotton. In such a field, it is necessary to change the pattern of fluid dispensing so that the upper moistening pads have no fluid passing into them.

Other objects and advantages of the present invention will become apparent to those skilled in the art as the nature of the invention is better understood from the following description and as shown in the accompanying drawings.

FIG. 1 is a plan view of the moistening mechanism and the portion of the harvester or picking drum.

FIG. 2 is a sectional view taken substantially along the line 2—2 of FIG. 1.

FIG. 3 is a plan view of the metering head of the moistener device.

FIG. 4 is a sectional view taken substantially along the line 4—4 of FIG. 1.

FIG. 5 is an enlarged sectional view taken substantially along the line 5—5 of FIG. 4.

The cotton harvester mechanism is normally disposed within a cotton picker housing shown only partially by an upper laterally disposed panel 11 and a floor panel 12. The housing normally has reinforcing therein so that its panels serve as the main frame for the picking mechanism. The picking mechanism, shown and described only partially in the present disclosure is composed of a series of upright picker bars 13 with laterally extending picking spindles 14. Each spindle 14 is rotated about its axis by means of a bevel gear drive 15 driven by an upright drive shaft 16. The upright drive shaft 16 extends into a header, indicated in its entirety by the reference numeral 17, which is adequately connected to an outside power source so that the spindles not only rotated about their own axes but the entire drum is driven about an upright axis of a main shaft 18. The upper ends of the shafts 16 are journaled in bearings 20 carried in the header 17. A suitable opening 21 is provided in the panel 11 to permit rotation of the picker drum. The picker drum may be of the type generally shown and described in U.S. Patent 2,721,436, which issued to Mr. A. L. Hubbard, October 25, 1955. Since the description of the picker drum and its respective drive mechanism is adequately disclosed therein, it is believed no further description is required for the present disclosure since reference may be had to that patent.

In many respects the present moistener mechanism is similar to that shown and described in U.S. Patent 3,004,376, which issued to Mr. Arthur L. Hubbard, October 17, 1961. The moistener mechanism includes columnar member 25 which is U-shaped and has vertically spaced openings 26 in one face thereof spaced on the order of the spacing of the spindles 14. Fixed to the columnar member 25 are vertically spaced arms 27 having moistener pads 28 on their outer ends overlying and engaging the spindles 14.

For purposes of explanation, the spindle ends of spindles 14 are indicated in their position from top to bottom by S–1, S–2 through S–10. It may be assumed, for purposes of illustration, that the picking drum is of a ten spindle variety. The columnar member 25 has welded thereto at its upper end a distributor head 30 provided with a series of vertically disposed holes or openings which are uniformly spaced angularly about an upright axis. The upper surface of the distributor head 30 is conical shaped and has a series of radial grooves extending from the center of the header radially to the aforesaid openings, the grooves being indicated by G–1, G–2, G–3, G–4, G–5, G–6, G–7, G–8, G–9 and G–10. The distributor head 30 has a flanged collar 31 bolted at 32 to the upper surface of the housing plate 11. The head 30 is also closed on its upper side by an annular cover 33 spaced from the top of the head 30 to define an opening 35.

A series of fluid conduits in the form of plastic hoses C–1, C–2, C–3, C–4, C–5, C–6, C–7, C–8, C–9 and C–10 extend from the openings at the base of the respective grooves G-1, G-2, G-3, G-4, G-5, G-6, G-7, G-8, G-9 and G-10 through the opening 26 and into the pads 28 which lie above the respective spindle ends S-1, S-2 through S-10. The upper ends of the conduits C-1 through C-10 are flared outwardly and generally are sealed in the openings at the base of the grooves G-1 through G-10. The manner of attachment to the pads 28 is shown in detail in the aforementioned Hubbard Patent 3,004,376.

The cover 33 has a vertical hub portion 36 supporting an internal vertically disposed journal 37 which protrudes axially above the hub 36. Fixed to the protruding portion of the journal 37 is a ratchet 38. The journal member 37 also has rigidly fixed thereto an internal L-shaped fluid dispensing element 39 having a vertical leg portion within the journal 37 and a laterally disposed leg disposed within the opening 35. The element 39 may be rotated so that the discharge end thereof will pass over the various grooves G-1 through G-10 for purposes of discharging fluid into the conduits C-1 through C-10. The dispensing element 39 may be of either a plastic or metallic substance. Directly above the upper open end of the fluid dispenser 39 is a main conduit 40 receiving fluid from a main fluid container, not shown. A fitting 41 is provided on the conduit 40 and mounts the conduit on an upper panel wall 42 which is also part of the main housing of the cotton harvester. A fluid discharge valve, indicated only partially at 43 is positioned in the lower end of the conduit 40 and feeds directly into the conduit 39.

A pawl carrier 45 is supported on the hub 36 by means of a collar 46 journalled on the outer surface of the hub 36. A pawl 47 is pivotally mounted on the carrier 45 and engages the teeth of the ratchet 38.

A reinforcing plate 50 is bolted, as at 51, to the top surface of the housing panel 11. The plate has a vertical boss 52 pivotally carrying an upright pin 53. At the lower end of the pin 53 is a laterally extending arm 54 integral therewith which extends toward the header 17 of the harvesting drum. A stop element 49 depends from the under surface of the panel 11 so as to limit the pivotal movement of the pin 53 and its arm 54. The upper end of the pin 53 carries a laterally extending arm 55 disposed above the panel 11 and having a relatively long slot 56 therein. The pin 53 and arms 54, 55, being rigidly joined, may be treated as a single rockable member. A two-piece adjustable link 58 extends from the slot 56 to the pawl carrier 45. The link or rod 58 has an upwardly turned end extending through the carrier 45 and is held in the carrier by means of a cotter key 59. A small spring 60 extends from the cotter key 59 to one end of the pawl 47. The rod or link 58 is connected to the slot 56 by means of a bracket or plate 61 which normally overlies the arm 55 and is connected thereto by a bolt 62 extending through the plate 61 and through the arm 55. The bolt 62 is clamped to the arm 55 by means of a pair of nuts 65, 66. By loosening and tightening the nuts 65, 66 the entire rod may be adjusted longitudinally in the slot 56. The threaded section on the end of the rod 58 connecting the rod 58 to the bracket 61 is provided for minute adjustments to properly position the fluid dispenser 39 directly over the slot in the header 30. A second spring 70 extends from the arm 55 to an upwardly projecting bracket 71 fixed to the upper surface of the supporting plate 50.

Welded to the journal castings 20 are a series of laterally disposed plates 73 having vertical holes 74 therein and lugs 75 depending from their undersides. An abutment bracket 76 is fixed to the underside of a plate 73 and includes a laterally extending section 77 which projects outwardly from the harvesting drum for purposes of contacting the arm 54. The inner end of the bracket 76 includes a laterally disposed portion 77 slotted at its upper surface to receive the lug 75. The abutment bracket 76 is fixed to the supporting plates 73 by means of a bolt 79 extending through the plate 73 and the laterally disposed portion 77. As may be seen from viewing FIGS. 1 and 2 in the drawings, there are several mounting plates 73 mounted on the harvesting drum. Each plate is capable of supporting an abutment bracket 77 and consequently should it be desired to increase the rate of movement of the pawl 47, additional abutment plates may be added at the desired location on the harvesting drum.

The moistening mechanism as above described operates in the following manner. The rod 58 is normally positioned in the slot 56 in the location shown in FIG. 1. In this position each movement of the bell crank, consisting of the arms 54, 55 and rod 53, causes the pawl 47 to move the dispenser 39 from one groove in the upper surface of the header to the next adjacent groove. For example, as the harvesting drum rotates one complete cycle, the bracket 76 contacts the arm 54 to cause the dispenser 39 to move from the groove G-1 to the groove G-6. The next rotation of the drum moves the dispenser to the next groove G-2. Therefore in normal operation of the fluid dispenser, for each ten revolutions of the harvester drum there will be fluid dispensed in each of the ten fluid conduits C-1 through C-10.

In some instances when the cotton plants are relatively low and it is desired to not pass fluid into the upper five conduits C-1 through C-5, the dispenser is manually set at one of the grooves G-6–G-10. The rod 58 is then set at the outer end of the slot 56 and locked in that position. Since the rod is then twice the previous distance from the pin 53 it will cause a double throw of the pawl 45 each time the arm 54 is contacted by the abutment bracket 76. Thus, fluid will move only into the conduits C-6–C-10 which feed to the lower five moistener pads.

Should it be desired to increase the number of throws or pawl movement either in the single or double throws, it is necessary only to add additional abutment plates on the supporting plates 73 provided on the drum. Therefore the rate of movement of the pawl as well as the amount of throw of the pawl may be manually adjusted in the moistening device.

While only one form of the invention has been shown, it should be recognized that other forms and variations will occur to those skilled in the art. Therefore, while the present form was shown and described in concise and detailed manner for the purpose of clearly illustrating the the principles of the invention, it should be understood that there was no intention to limit or narrow the invention beyond the broad concept set forth in the appended claims.

What is claimed is:

1. A moistener assembly for a cotton harvesting unit having a main frame and an upright picking drum mounted on the frame and rotatable about an upright axis with vertically spaced picking spindles extending laterally therefrom, the moistener assembly comprising: an upright columnar member supported on the frame and having vertically spaced apart openings spaced on the order of the spindles; a plurality of fluid conducting tubes disposed within the columnar member and extending through the respective openings with outer ends terminating outwardly of the columnar member and with opposite upwardly extending ends terminating in an annular row; a plurality of vertically spaced arms fixed to and extending from the columnar member and having moistener pad means on their projecting ends receiving fluid from the fluid conducting tubes; a fluid dispenser rotatably supported on the frame above the annular row of tube ends; a pawl and ratchet associated with the dispenser for rotating the latter; a pawl operating linkage supported on the frame; and lug means on the picking drum adapted for contact with the linkage for effectively moving the dispenser annularly a predetermined amount as the drum rotates.

2. A moistener assembly for a cotton harvesting unit having a main frame and an upright picking drum mounted on the frame and rotatable about an upright axis with vertically spaced picking spindles extending laterally therefrom, the moistener assembly comprising: an upright columnar member supported on the frame and having vertically spaced apart openings spaced on the order of the spindles; fluid conduit means in the columnar member for feeding fluid to the respective openings and having upper fluid inlets in an annular row; a plurality of vertically spaced arms fixed to and extending from the columnar member and having moistener pad means on their projecting ends adapted to receive fluid passing through the openings; a fluid dispenser positioned above the annular row of inlets and rotatably supported on the frame for movement adjacent the inlets; a pawl and ratchet associated with the dispenser; a pawl operating linkage supported on the frame; and lug means on the picking drum adapted to contact the linkage for moving the dispenser annularly a predetermined amount as the drum rotates.

3. The invention defined in claim 2 further characterized by the pawl operating linkage being adjustable to effect the throw of the pawl to thereby effect the predetermined amount of annular movement of the dispenser.

4. The invention defined in claim 2 in which the fluid conduits means includes conduits leading from the inlets to the moistener pad means and the inlets for the conduits of the upper half of the arms are alternately spaced in the annular row and further characterized by the pawl operating linkage being adjustable whereby alternate inlets may be skipped as the dispenser is rotated.

5. The invention defined in claim 2 in which the fluid conduit means includes conduits leading from the inlets to the moistener pad means, and further characterized by the pawl operating linkage being adjustable whereby inlets may be skipped as the dispenser is rotated.

6. A moistener assembly for a cotton harvesting unit having a main frame and an upright picking drum mounted on the frame and rotatable about an upright axis with vertically spaced picking spindles extending laterally therefrom, the moistener assembly comprising: an upright columnar member supported on the frame and having vertically spaced apart openings spaced on the order of the spindles; a plurality of fluid conduits disposed within the columnar member for feeding fluid to the respective openings and having fluid inlets disposed in an annular row; a plurality of vertically spaced arms fixed to and extending from the columnar member and having moistener pad means adapted to receive fluid through the opening; a fluid dispenser positioned above the annular row of inlets and rotatably supported on the frame about the axis of the annular row of inlets so as to move adjacent the inlets forming the annular row; a pawl and ratchet associated with the dispenser and effective to move the dispenser in an intermittent rotational motion; a rockable member supported on the frame; a link extending from the rockable member to the pawl and means on the picking drum contacting the rockable member for rocking the member in response to rotation of the drum.

7. The invention defined in claim 6 in which the connections of the link connecting pawl to the rockable member are adjustable whereby the length of throw of the pawl may be adjusted.

References Cited in the file of this patent
UNITED STATES PATENTS

| | | |
|---|---|---|
| 963,470 | Du Pont | July 5, 1910 |
| 1,063,295 | Sheldon | June 3, 1913 |
| 2,433,083 | Baker et al. | Dec. 23, 1947 |
| 2,787,880 | Fergason | Apr. 9, 1957 |
| 3,004,376 | Hubbard | Oct. 17, 1961 |
| 3,066,467 | Barfield | Dec. 4, 1962 |